United States Patent
Dris et al.

(10) Patent No.: US 7,314,658 B2
(45) Date of Patent: *Jan. 1, 2008

(54) STORAGE MEDIUM FOR DATA

(75) Inventors: Irene Dris, Clifton Park, NY (US); Grant Hay, Niskayuna, NY (US); Steven Frederick Hubbard, West Sand Lake, NY (US); Hendrik Theodorus Van De Grampel, Boz (NL); Geert Boven, Steenbergen (NL)

(73) Assignee: General Electric Company, Schenectady, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 11/303,568

(22) Filed: Dec. 14, 2005

(65) Prior Publication Data

US 2006/0099377 A1 May 11, 2006

Related U.S. Application Data

(63) Continuation of application No. 11/032,417, filed on Jan. 10, 2005, now Pat. No. 7,029,742, which is a continuation of application No. 10/417,718, filed on Apr. 17, 2003, now Pat. No. 6,893,700, which is a continuation of application No. 09/683,500, filed on Jan. 9, 2002, now Pat. No. 6,716,505.

(60) Provisional application No. 60/316,534, filed on Aug. 31, 2001.

(51) Int. Cl.
*B32B 3/02* (2006.01)
(52) U.S. Cl. ............... 428/64.1; 428/64.4; 430/270.12
(58) Field of Classification Search ............... 428/64.1, 428/64.4; 430/270.11, 270.12
See application file for complete search history.

(56) References Cited

U.S. PATENT DOCUMENTS 4,217,438 A 8/1980 Brunelle et al. ............ 528/202

(Continued)

FOREIGN PATENT DOCUMENTS

EP 0 225 801 B2 12/1986

(Continued)

OTHER PUBLICATIONS

JP61063942. Publication Date Apr. 2, 1986 "Optical Information Recording Disk" Abstract Only.

(Continued)

*Primary Examiner*—Elizabeth Mulvaney
(74) *Attorney, Agent, or Firm*—Cantor Colburn LLP

(57) ABSTRACT

This disclosure relates to a data storage medium, and in particular to a data storage medium comprising at least one high modulus layer. In one embodiment, an asymmetric optical storage medium can comprise: a substrate layer comprising polyarylene ether, a high modulus layer comprising a thermoset, and a data layer disposed between the modulus layer and the substrate layer. The high modulus layer has a tensile modulus that is greater than a substrate layer tensile modulus. In another embodiment, an asymmetric optical storage medium can comprise: a substrate layer comprising polyarylene ether and having surface features and a high modulus layer disposed on the side of the substrate comprising the surface features. The surface features can comprise pits. The high modulus layer can comprise a thermoset, and can have a tensile modulus that is greater than a substrate layer tensile modulus.

20 Claims, 1 Drawing Sheet

U.S. PATENT DOCUMENTS

| | | | |
|---|---|---|---|
| 4,373,065 A | 2/1983 | Prest, Jr. | 525/132 |
| 4,441,179 A | 4/1984 | Slaten | 369/275 |
| 4,680,211 A | 7/1987 | Evans et al. | 428/65 |
| 4,719,594 A | 1/1988 | Young et al. | 365/113 |
| 4,845,142 A | 7/1989 | Niwano et al. | 524/287 |
| 4,889,756 A | 12/1989 | Barzynski et al. | 428/64 |
| 4,954,591 A | 9/1990 | Belmares | 526/264 |
| 4,957,776 A | 9/1990 | Higuchi et al. | 427/54.1 |
| 4,987,194 A | 1/1991 | Maeda et al. | 525/314 |
| 5,053,288 A | 10/1991 | Hashimoto et al. | 428/694 |
| 5,130,356 A | 7/1992 | Feuerherd et al. | 524/96 |
| 5,135,791 A | 8/1992 | Imai et al. | 428/65 |
| 5,312,663 A | 5/1994 | Kosinski et al. | 428/64 |
| 5,586,110 A | 12/1996 | Nakaki | 369/286 |
| 5,609,990 A | 3/1997 | Ha et al. | 430/270.11 |
| 5,635,278 A | 6/1997 | Williams | 428/172 |
| 5,863,997 A | 1/1999 | Smith | 526/301 |
| 5,942,290 A | 8/1999 | Leppard et al. | 427/510 |
| 6,025,114 A | 2/2000 | Popat et al. | 430/284.1 |
| 6,042,919 A | 3/2000 | Gorsuch | 428/64.1 |
| 6,066,218 A | 5/2000 | Kuhn et al. | 156/87 |
| 6,183,829 B1 | 2/2001 | Daecher et al. | 428/64.1 |
| 6,214,433 B1 | 4/2001 | Tronche et al. | 428/64.1 |
| 6,475,589 B1 | 11/2002 | Pai-Paranjape et al. | 428/64.1 |
| 6,489,376 B1 | 12/2002 | Khudyakov et al. | 522/96 |
| 6,645,596 B1 | 11/2003 | Murakama et al. | 428/64.1 |
| 6,667,952 B2 | 12/2003 | Komaki et al. | 369/275.5 |
| 6,775,838 B2 | 8/2004 | Komaki et al. | 720/718 |
| 6,893,700 B2 * | 5/2005 | Dris et al. | 428/64.1 |
| 6,924,017 B2 | 8/2005 | Shoji | 428/64.1 |
| 6,924,350 B2 | 8/2005 | Dong et al. | 528/481 |
| 7,029,742 B2 * | 4/2006 | Dris et al. | 428/64.1 |
| 2002/0048691 A1 | 4/2002 | Davis et al. | 428/694 |
| 2002/0094455 A1 | 7/2002 | Feist et al. | 428/694 |
| 2002/0176957 A1 | 11/2002 | Mino et al. | 428/64.6 |
| 2002/0197441 A1 | 12/2002 | Hariharan et al. | 428/65.1 |
| 2003/0044564 A1 | 3/2003 | Dris et al. | 428/64.4 |
| 2003/0198774 A1 | 10/2003 | Dris et al. | 428/64.1 |
| 2004/0063031 A1 | 4/2004 | Gallucci et al. | 430/270.11 |
| 2005/0117405 A1 | 6/2005 | Dris et al. | 365/189.05 |
| 2005/0129953 A1 | 6/2005 | Breitung et al. | 428/411.1 |
| 2005/0180284 A1 * | 8/2005 | Hay et al. | 369/53.21 |
| 2005/0202201 A1 | 9/2005 | Hay et al. | 428/64.2 |
| 2005/0233151 A1 | 10/2005 | Feist et al. | 428/421 |

FOREIGN PATENT DOCUMENTS

| | | |
|---|---|---|
| EP | 0 271 000 B1 | 12/1987 |
| EP | 0 295 891 A2 | 6/1988 |
| EP | 0 303 209 A2 | 8/1988 |
| EP | 0 395 369 B1 | 4/1990 |
| EP | 0 467 705 B1 | 7/1991 |
| EP | 0 642 124 B1 | 9/1994 |
| EP | 0 691 361 B1 | 6/1995 |
| EP | 0 724 259 A2 | 1/1996 |
| EP | 0 896 328 B1 | 7/1998 |
| EP | 1 047 055 A1 | 4/1999 |
| EP | 1 031 972 A2 | 2/2000 |
| EP | 1 130 587 A2 | 3/2001 |
| EP | 1 271 499 A2 | 6/2002 |
| EP | 1 321 930 A1 | 6/2003 |
| JP | 63-13722 | 1/1988 |
| JP | 63-56832 | 3/1988 |
| JP | 6356832 | 3/1998 |
| WO | WO 98/20555 | 5/1998 |
| WO | WO 99/59143 | 11/1999 |
| WO | WO 01/11618 A1 | 2/2001 |
| WO | WO 02/25376 A2 | 3/2002 |
| WO | WO 03/052757 A1 | 6/2003 |

OTHER PUBLICATIONS

JP6220734. Publication Date Dec. 17, 1987 "Base for Optical Recording Medium and its Production:" Abstract Only.

JP63124244. Publication Date May 27, 1988 "Optical Disk" Abstract Only.

JP63309547. Publication Date Dec. 16, 1988 "Optical Resin Molding" Abstract Only.

JP3281220. Publication Date Dec. 11, 1991 "Oriented Material" Abstract Only.

JP4321950. Publication Date Nov. 11, 1992 "Optical Disk" Abstract Only.

JP8055341. Publication Date Feb. 27, 1996 "Optical Disk Medium and Optical Disk Device" Abstract Only.

JP9035330. Publication Date Feb. 7, 1997. "Optical Disk and Production of Optical Disk" Abstract Only.

JP02183443A; Publication Date: Jul. 18, 1990; "Optical Recording Medium"; Abstract Only.

JP9054982. Publication Date Feb. 25, 1997 "Optical Disk Substrate and its Production" Abstract Only.

JP2001060338. Publication Date Mar. 6, 2001 "Optical Recording Medium" Abstract Only.

JP2001067726. Publication Date Mar. 16, 2001 "Optical Disk" Abstract Only.

"Modeling for Suppression of Moisture/Temperature Composite Structures With Perfect Bonding", Yiping Qui et al., Textile Res., vol. 68(1), pp. 1-9, 1988.

http://www.sony.net/sonyinfo/news/press/200202/02-0219e; Large Capacity Optical Disc Video Recording Format "Blu-ray Disc"; Feb. 19, 2002; 3 pages.

JP 63-056832; published Mar. 11, 1988; Magneto-Optical Disk having Improved Environmental Resistance; Abstract Only; 1 page.

* cited by examiner

STORAGE MEDIUM FOR DATA

CROSS REFERENCE TO RELATED APPLICATIONS

This application is a continuation of U.S. application Ser. No. 11/032,417 filed Jan. 10, 2005 now U.S. Pat. No. 7,029,742, which is application is a continuation of 10/417,718, filed Apr. 17, 2003, now U.S. Pat. No. 6,893,700, issued May 17, 2005, which is a continuation of U.S. application Ser. No. 09/683,500 filed Jan. 9, 2002, now U.S. Pat. No. 6,716,505, which claims priority to U.S. Provisional Ser. No. 60/316,534 filed Aug. 31, 2001, all of which are incorporated herein in their entirety.

BACKGROUND OF INVENTION

This disclosure relates to a data storage medium, and in particular to a data storage medium comprising a high modulus layer used to control the overall degree of flatness in the storage medium.

An increase in data storage density in optical data storage media is desired to improve data storage technologies, such as, but not limited to, read-only media, write-once media, rewritable media, digital versatile media and magneto-optical (MO) media.

As data storage densities are increased in optical data storage media to accommodate newer technologies, such as, but not limited to, digital versatile disks (DVD) and higher density data disks for short and long term data archives such as digital video recorders (DVR), the design requirements for the transparent component of the optical data storage devices have become increasingly stringent. Optical disks with progressively shorter reading and writing wavelengths have been the object of intense efforts in the field of optical data storage devices. Materials and methods for optimizing physical properties of data storage devices are constantly being sought. Design requirements for the material used in optical data storage media include, but are not limited to, disk flatness (e.g., tilt), water strain, low birefringence, high transparency, heat resistance, ductility, high purity, and medium homogeneity (e.g., particulate concentration). Currently employed materials are found to be lacking in one or more of these characteristics, and new materials are required in order to achieve higher data storage densities in optical data storage media. Disk flatness, also referred to as tilt, is a critical property needed for high data storage density applications. Consequently, a long felt yet unsatisfied need exists for data storage media having improved dimensional stability and minimal tilt.

SUMMARY OF INVENTION

In one embodiment, An asymmetric optical storage medium can comprise: a substrate layer comprising polyarylene ether, a high modulus layer comprising a thermoset, and a data layer disposed between the high modulus layer and the substrate layer. The high modulus layer has a tensile modulus that is greater than a substrate layer tensile modulus.

In another embodiment, the asymmetric optical storage medium can comprise: a substrate layer comprising polyarylene ether and having surface features, wherein the surface features comprise pits, and a high modulus layer disposed on the side of the substrate comprising the surface features, wherein the high modulus layer comprises a thermoset. The high modulus layer has a tensile modulus that is greater than a substrate layer tensile modulus.

Various features, aspects, and advantages of the present disclosure will become apparent with reference to the following detailed description, appended claims, and accompanying figures.

DETAILED DESCRIPTION

Figure 1:
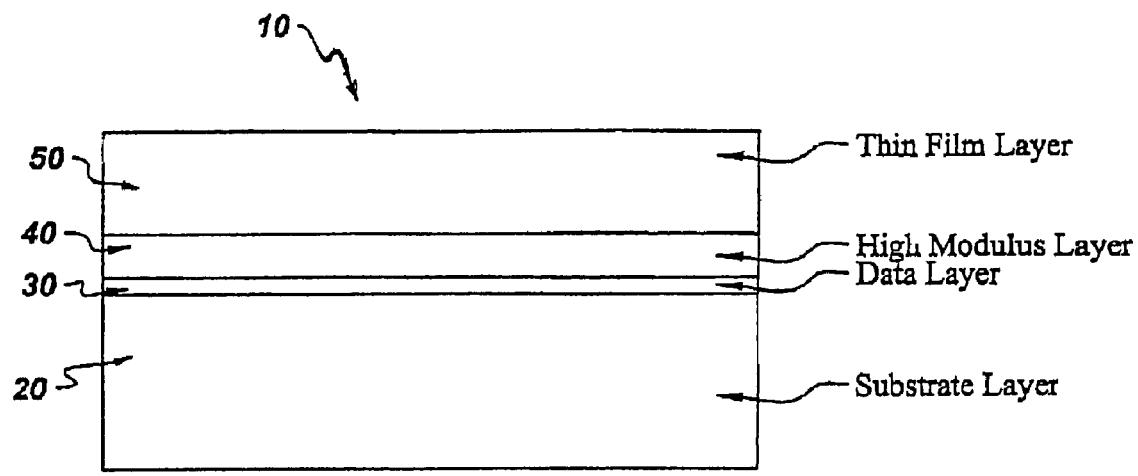
FIG. 1 is a cross sectional view of one embodiment of the present data storage medium (10), wherein the medium comprises a substrate layer (20), which is in direct contact with a data layer (30), the data layer (30), which is in direct contact with a high modulus layer (40), and the high modulus layer (40), which is in direct contact with a thin film layer (50).

The present disclosure describes the use of polymeric material as storage media for data, wherein this storage medium may have an improved directional stability. In one embodiment of the present disclosure, the storage medium for data (part 10 in FIG. 1; part 60 in FIG. 2) comprises a plurality of layers comprising at least one substrate layer, at least one data layer that is in direct contact with the substrate layer, at least high modulus layer, and at least one thin film layer. As used herein, the term "high modulus" refers to a tensile modulus typically greater than about 1 Gigapascal (Gpa). The high modulus layer can have a tensile modulus that is greater than or equal to the substrate tensile modulus. The high modulus layer effectively increases the dimensional stability of the data storage medium by reducing the tilt of the data storage medium. As used herein, the term "tilt" refers to the number of radial degrees by which a data storage medium bends on a horizontal axis, and is typically measured as the vertical deviation at the outer radius of the storage medium. Typically, the tilt is half of the average radial deviation (the deviation of a laser beam) as measured in degrees.

In the context of the present disclosure, a typical data storage medium is composed of a plurality of polymeric components, which are generally combined in overlaying horizontal layers of various thicknesses, depending on the specific properties and requirements of the data storage medium. A major component of a data storage medium is a substrate layer (part 20 in FIG. 1; part 70 in FIG. 2). The substrate layer is typically made of a polymeric material, which comprises at least one member selected from the group consisting of a thermoplastic, a thermoset, and any combination thereof. Both addition and condensation polymers are suitable for the present invention. As used herein the term "thermoplastic polymer", also referred to in the art as a thermoplastic resin, is defined as a material with a macromolecular structure that will repeatedly soften when heated and harden when cooled. Illustrative classes of thermoplastic polymers include, but are not limited to, styrene, acrylics, polyethylenes, vinyls, nylons, and fluorocarbons. As used herein the term "thermoset polymer", also referred to in the art as a thermoset resin, is defined as a material which solidifies when first heated under pressure, and which cannot be remelted or remolded without destroying its original characteristics. Illustrative classes of thermoset polymers included, but are not limited to, epoxides, malamines, phenolics, and ureas.

Illustrative examples of thermoplastic polymers which are suitable for the substrate layer include, but are not limited to, olefin-derived polymers (e.g., polyethylene, polypropylene, and their copolymers), polymethylpentane; diene-derived polymers (e.g., polybutadiene, polyisoprene, and their copolymers), polymers of unsaturated carboxylic acids and their functional derivatives (e.g., acrylic polymers such as poly(alkyl acrylates), poly(alkyl methacrylates), polyacrylamides, polyacrylonitrile and polyacrylic acid), alkenylaromatic polymers (e.g., polystyrene, poly-alpha-methylstyrene, polyvinyltoluene, and rubber-modified polystyrenes), polyamides (e.g., nylon-6, nylon-6,6, nylon-1,1, and nylon-1,2), polyesters; polyketones; polycarbonates; polyester carbonates; polyethers such as aromatic polyethers, polyarylene ethers, polyethersulfones, polyetherketones, polyetheretherketones, polyetherimides; polyarylene sulfides, polysulfones, polysulfidesulfones; and liquid crystalline polymers. In one embodiment, the substrate layer comprises a thermoplastic polyester. Suitable examples of thermoplastic polyesters include, but are not limited to, poly(ethylene terephthalate), poly(1,4-butylene terephthalate), poly(1,3-propylene terephthalate), poly(cyclohexanedimethanol terephthalate), poly (cyclohexanedimethanol-co-ethylene terephthalate), poly(ethylene naphthalate), poly(butylene naphthalate), and polyarylates. For example, the substrate layer can comprise a polyester, a polycarbonate, a polystyrene, a polymethylmethacrylate, a polyketone, a polyamide, an aromatic polyether, a polyether-sulfone, a polyetherimide, a polyether ketone, a polyphenylene ether, a polyphenylene sulfide, and any combinations thereof.

In another embodiment the substrate layer comprises a thermoplastic elastomeric polyesters (TPEs). As defined herein, a thermoplastic elastomer is a material that can be processed as a thermoplastic material, but which also possesses some of the properties of a conventional thermoset resin. Suitable examples of thermoplastic elastomeric polyesters include, but are not limited to, polyetheresters, poly (alkylene terephthalate), poly(ethylene terephthalate), poly (butylene terephthalate), polyetheresters containing soft-block segments of poly (alkylene oxide) particularly segments of poly(ethylene oxide) and poly(butylene oxide), polyesteramides such as those synthesized by the condensation of an aromatic diisocyanate with dicarboxylic acids, and any polyester with a carboxylic acid terminal group.

Optionally, the substrate layer can further comprise at least one dielectric layer, at least one insulating layer, or any combinations thereof. The dielectric layer(s), which are often employed as heat controllers, typically have a thickness between about 200 Å and about 1,000 Å. Suitable dielectric layers include, but are not limited to, a nitride layer (e.g., silicone nitride, aluminum nitride), an oxide layer (e.g. aluminum oxide), a carbide layer (e.g., silicon carbide), and any combinations comprising at least one of the foregoing and any compatible material that is not reactive with the surrounding layers.

Figure 2:
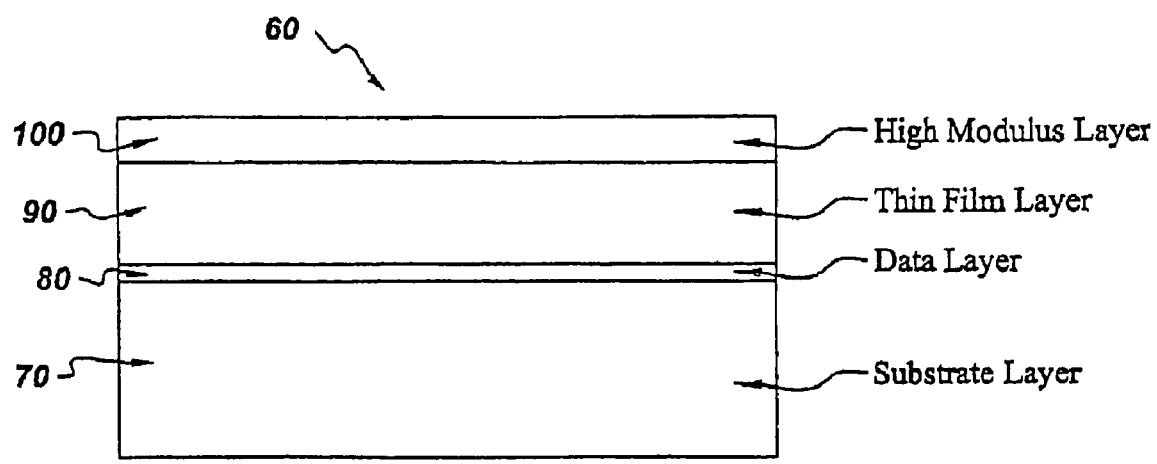
FIG. 2 is a cross sectional view of another embodiment of the present data storage medium (60), wherein the medium comprises a substrate layer (70), which in direct contact with a data layer (80), the data layer (80), which is in direct contact with a thin film layer (90), and the thin film layer (90), which is in direct contact with a high modulus layer (100).

In the context of the present disclosure, a typical data storage medium further comprises at least one data layer (part 30 in FIG. 1; part 80 in FIG. 2). The data layer, which typically comprises a reflective metal layer, can be made of any material capable of storing retrievable data, such as an optical layer, a magnetic layer, a magneto-optic layer. The thickness of a typical data layer can be up to about 600 Angstroms (Å). In one embodiment, the thickness of the data layer is up to about 300 Å. The information which is to be stored on the data storage medium can be imprinted directly onto the surface of the data layer, or stored in a photo-, thermal-, or magnetically-definable medium which has been deposited onto the surface of the substrate layer. Suitable data storage layers are typically composed of at least one material selected from the group consisting of, but are not limited to, oxides (e.g., silicone oxide), rare earth element-transition metal alloys, nickel, cobalt, chromium, tantalum, platinum, terbium, gadolinium, iron, boron, organic dyes (e.g., cyanine or phthalocyanine type dyes), inorganic phase change compounds (e.g., TeSeSn or InAgSb), and any alloys or combinations comprising at least one of the foregoing.

The reflective metal layer(s) should be of a thickness that is sufficient to reflect an amount of energy, which is sufficient to enable data retrieval. Typically, a reflective layer has a thickness up to about 700 Å. In one embodiment the thickness of the reflective layer is in between about 300 Å and about 600 Å. Suitable reflective layers include, but are not limited to, aluminum, silver, gold, titanium, and alloys and mixtures comprising at least one of the foregoing. In addition to the data storage layer(s), dielectric layer(s), protective layer(s), and reflective layer(s), other layers can be employed such as lubrication layer(s), adhesive layer(s) and others. Suitable lubricant layers include, but are not limited to, fluoro compounds such as fluoro oils and greases.

In the context of the present disclosure, a typical data storage medium further comprises at least one high modulus layer (part 40 in FIG. 1; part 100 in FIG. 2). In one embodiment of the present disclosure, a suitable high modulus layer typically comprises a thermoset polymer, which can be cured thermally, cured by ultraviolet (UV) radiation, or cured by any method commonly known to those skilled in the art. In another embodiment of the present disclosure, the high modulus layer comprises a thermoplastic polymer. In yet another embodiment of the present disclosure, the high modulus layer comprises a combination of a thermoset polymer and a thermoplastic polymer. Typically, the high modulus layer is applied to the storage medium via a spin-coating process, however, any method known to those skilled in the art such as, but not limited to, spray deposition, sputtering, and plasma deposition can be used to deposit a high modulus layer with a thickness in a range between about 0.01 micrometers (μm) and about 50 micrometers (μm), or, more specifically, about 0.5 micrometers and about 30 micrometers, onto the data storage medium. Illustrative examples of thermoset polymers include, but are not limited to, polymers derived from acrylates, silicones, polyphenylene ethers, epoxies, cyanate esters, unsaturated polyesters, multifunctional allylic materials, diallylphthalate, acrylics, alkyds, phenol-formaldehyde, novolacs, resoles, bismaleimides, melamine-formaldehyde, urea-formaldehyde, benzocyclobutanes, hydroxymethylfurans, isocyanates, and any combinations thereof. Some possible examples of materials for the high modulus layer include: a silicone hardcoat, silica with hydrolizable silanes, a siloxane, an epoxy, a urethane, an imide, and any combination thereof. Other examples include a poly-methylmethacrylate, a methyl methacrylate-polyimide copolymer, a methyl methacrylate-silicone copolymer, and combinations comprising at least one of the foregoing. In yet another example, the high modulus material can comprise: an acrylate, an epoxy, a silicone-acrylate, a urethane, and any combination thereof. In one embodiment, the thermoset polymer further comprises at least one thermoplastic polymer, such as, but not limited to, polyphenylene ether, polyphenylene sulfide, polysulfone, polyetherimide, or polyester. Typically, the high modulus layer is a copolycarbonate ester. The thermoplastic polymer is typically combined with a thermoset monomer mixture before curing of said thermoset. In addition the high modulus layer may be added during the lamination process of the pressure sensitive adhesive.

The data storage medium may also comprise a thin film layer (part 50 in FIG. 1; part 90 in FIG. 2) comprises at least one member selected from the group consisting of a homopolymer, a copolymer, a thermoplastic, a thermoset, and any mixtures thereof; and further wherein the thermoset is spin coated.

Currently, the dimensions of the storage medium are specified by the industry to enable their use in presently available data storage medium reading and writing devices. The data storage medium typically has an inner diameter in a range between about 15 mm and about 40 mm and an outer diameter in a range between about 65 mm and about 130 mm, a substrate thickness in a range between about 0.4 mm and about 2.5 mm with a thickness up to about 1.2 mm typically preferred. Other diameters and thickness may be employed to obtain a stiffer architecture if necessary.

The storage medium described herein can be employed in conventional optic, magneto-optic, and magnetic systems, as well as in advanced systems requiring higher quality storage medium, areal density, or any combinations thereof. During use, the storage medium is disposed in relation to a read/write device such that energy (for instance, magnetic, light, electric, or any combination thereof) is in contact with the data layer, in the form of an energy field incident on the data storage medium. The energy field contacts the data layer(s) disposed on the storage medium. The energy field causes a physical or chemical change in the storage medium so as to record the incidence of the energy at that point on a data layer. For example, an incident magnetic field might change the orientation of magnetic domains within a data layer or an incident light beam could cause a phase transformation where the light heats the point of contact on a data layer.

Numerous methods may be employed to produce the storage medium including, but not limited to, injection molding, foaming processes, sputtering, plasma vapor deposition, vacuum deposition, electrodeposition, spin coating, spray coating, meniscus coating, data stamping, embossing, surface polishing, fixturing, laminating, rotary molding, two shot molding, coinjection, over-molding of film, microcellular molding, and combinations thereof. In one embodiment, the technique employed enables in situ production of the substrate having the desired surface features, for example, pits and grooves. One such process comprises an injection molding-compression technique where a mold is filled with a molten polymer as defined herein. The mold may contain a preform or insert. The polymer system is cooled and, while still in at least partially molten state, compressed to imprint the desired surface features, for example, pits and grooves, arranged in spiral concentric or other orientation, onto the desired portions of the substrate, i.e., one or both sides in the desired areas. The substrate is then cooled to room temperature.

The following examples are included to provide additional guidance to those skilled in the art in practicing the claimed invention. The examples provided are merely representative of the present disclosure. Accordingly, the following examples are not intended to limit the invention, as defined in the appended claims, in any manner.

EXAMPLES

Circular data storage disks were prepared as follows. A substrate layer of 4,4-isopropylidenediphenol-polycarbonate polymer (BPA-PC) was molded into circular disks about 1.1 mm thick, and with an inner radius of about 15 mm and an outer radius of about 120 mm. A metallic data layer, of about 500 Angstroms thick, was sputtered to one of the surfaces of the BPA-PC substrate disks. Various thicknesses, described in table 1, of an acrylic lacquer layer (Daicure SD-698) were spin coated onto the metallic data layer of the disks, and the lacquer was cured using UV radiation. A co-polycarbonate-ester thin film of about 75 micron thickness, was bonded to the acrylic layer of the disks using a 25 micron thickness pressure sensitive adhesive of negligible modulus, to yield circular data storage disks with a layer configuration similar to that disclosed in FIG. 2. The data storage disks were equilibrated in an environment of a humidity of about 50%. The data storage disks were then transferred from this first environment of an initial humidity of about 50%, to a second environment with humidity of about 90%. The tilt of the data storage disks was measured over time at a radius of 55 mm while the disk equilibrated in the 90% humidity. The results of the maximum radial tilt measured over the dynamic as the disks re-equilibrated to the 90% humidity environment for the data storage disks with varying thickness of the spin-coated high modulus layer are described in Table 1.

TABLE 1

| High Modulus Lacquer thickness (microns) | Maximum Radical tilt at 55 mm (degrees) |
| --- | --- |
| 0 | 0.316 |
| 6.6 | 0.196 |
| 14.6 | 0.127 |
| 27.1 | −0.171 |

As disclosed by the results in Table 1, the addition of the high modulus lacquer layer to the data storage disks reduces the radial tilt-of the disks during the dynamic period during which the data storage disks are equilibrating from the first to the second humidity level.

While the invention has been illustrated and described, it is not intended to be limited to the details shown, since various modifications and substitutions can be made without departing in any way from the spirit of the present disclosure. As such, further modifications and equivalents of the invention herein disclosed can occur to persons skilled in the art using no more than routine experimentation, and all such modifications and equivalents are believed to be within the spirit and scope of the disclosure as defined by the following claims.

What is claimed is:

1. An asymmetric optical storage medium, comprising:
   a substrate layer comprising polyarylene ether;
   a high modulus layer comprising a thermoset, wherein the high modulus layer has a tensile modulus that is greater than a substrate layer tensile modulus; and
   a data layer disposed between the high modulus layer and the substrate layer.

2. The optical storage medium of claim 1, wherein the thermoset comprises an ultra-violet light cured thermoset.

3. The optical storage medium of claim 1, wherein the thermo set was derived from a material selected from the group consisting of an acrylate, an epoxy, and a silicone.

4. The optical storage medium of claim 3, wherein the thermoset was derived from a silicone-acrylate.

5. The optical storage medium of claim 1, wherein the thermoset comprises silica with hydrolizable silanes.

6. The optical storage medium of claim 1, wherein the thermoset comprises a silicone hardcoat.

7. The optical storage medium of claim 1, wherein the data layer comprises imprinted data.

8. The optical storage medium of claim 1, wherein the substrate layer comprises surface features, wherein the surface features comprise pits, and wherein the data layer is a reflective layer.

9. The optical storage medium of claim 1, comprising another data layer.

10. The optical storage medium of claim 1, wherein the substrate layer comprises surface features, and wherein the surface features comprise grooves.

11. The optical storage medium of claim 1, wherein the data layer comprises an inorganic phase change compound.

12. The optical storage medium of claim 1, wherein the data layer comprises an organic dye.

13. The optical storage medium of claim 1, wherein the data layer comprises a reflective material is selected from the group comprising silver, silver alloys, and combinations comprising at least one of the foregoing.

14. The optical storage medium of claim 1, the substrate further comprises a dielectric layer and wherein the dielectric layer comprises aluminum nitride.

15. The optical storage medium of claim 1, further comprising:
a reflective layer disposed between the high modulus layer and the substrate layer;
an initial dielectric layer disposed between the data layer and the substrate; and
an additional dielectric layer disposed between the data layer and the high modulus layer.

16. The optical storage medium of claim 1, wherein the substrate layer further comprises polystyrene.

17. An asymmetric optical storage medium comprising:
a substrate layer comprising polyarylene ether and having surface features, wherein the surface features comprise pits; and
a high modulus layer disposed on the side of the substrate comprising the surface features, wherein the high modulus layer comprises a thermoset, and wherein the high modulus layer has a tensile modulus that is greater than a substrate layer tensile modulus.

18. The optical storage medium of claim 17, further comprising a reflective layer disposed between the high modulus layer and the substrate layer.

19. The optical storage medium of claim 17, wherein the substrate layer further comprises polystyrene.

20. An asymmetric optical storage medium comprising:
a substrate layer comprising polyarylene ether and having surface features, wherein the surface features comprise grooves; and
a high modulus layer disposed on the side of the substrate comprising the surface features, wherein the high modulus layer comprises a thermoset, and wherein the high modulus layer has a tensile modulus that is greater than a substrate layer tensile modulus.

* * * * *